United States Patent [19]

Rutkowski et al.

[11] Patent Number: 4,796,712
[45] Date of Patent: Jan. 10, 1989

[54] DRAFT LOAD CONTROL SYSTEMS

[75] Inventors: David J. Rutkowski, Grosse Ile; Wendell J. Ver Ploeg, West Bloomfield; Larry I. Ross, Lake Orion, all of Mich.

[73] Assignee: Ford Motor Company, Dearborn, Mich.

[21] Appl. No.: 92,813

[22] Filed: Sep. 3, 1987

[51] Int. Cl.⁴ .......................................... A01B 63/112
[52] U.S. Cl. .......................................... 172/7; 172/8; 172/10
[58] Field of Search ................ 172/4, 7, 8, 9, 10, 172/2, 3, 4.5, 5, 6, 11, 12, 239; 37/DIG. 1, DIG. 20

[56] References Cited

U.S. PATENT DOCUMENTS

| 3,716,104 | 2/1973 | Koenig et al. | 172/8 |
| 4,077,475 | 3/1978 | Hino et al. | 172/7 |
| 4,221,266 | 9/1980 | Fardal | 172/4 |
| 4,385,353 | 5/1983 | Schneider | 172/2 |
| 4,503,916 | 3/1985 | Weigardt | 172/3 |
| 4,518,044 | 5/1985 | Weigardt et al. | 172/3 |

FOREIGN PATENT DOCUMENTS 8201354 4/1982 PCT Int'l Appl. .................... 172/7

Primary Examiner—Deborah L. Kyle
Assistant Examiner—John W. Eldred
Attorney, Agent, or Firm—Allan J. Lippa; Peter Abolins

[57] ABSTRACT

A control system and method for adjusting the depth of a tractor-drawn draft implement in response to a detection of draft load. The control system compares actual engine rpm to a stored or mapped value of engine rpm at zero engine load conditions for the throttle setting in use. An indication of engine lug-down is thereby obtained. Through the use of another memory related to the engine torque versus rpm curve, for the actual throttle setting in use, a draft load signal is obtained. As determined by an operator sensitivity setting, a preselected portion of the draft load signal is then combined with a preselected portion of an actual draft depth position signal to form a feedback signal. A signal represntative of the draft depth desired by the operator is then combined with the feedback signal to form a command signal for raising or lowering the draft implement via a hydraulic powerlift valve.

9 Claims, 3 Drawing Sheets

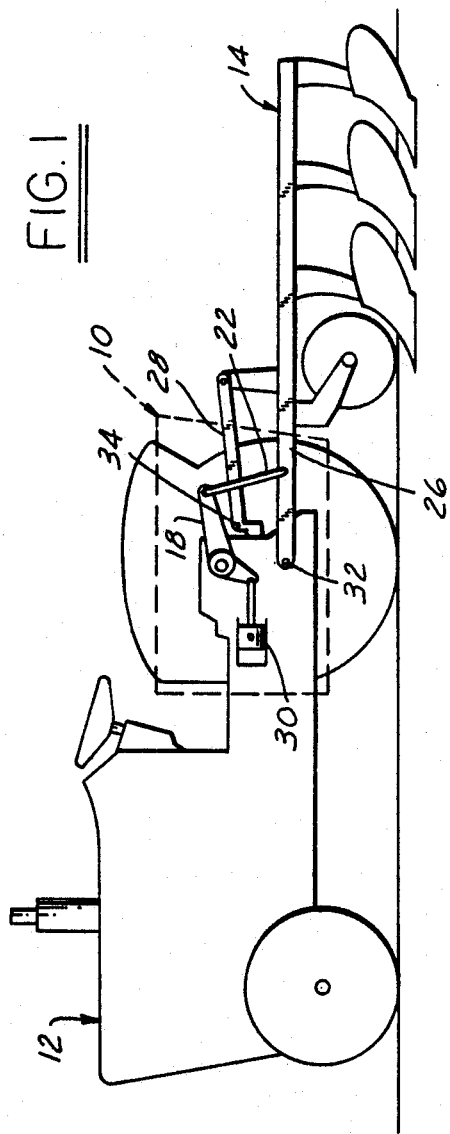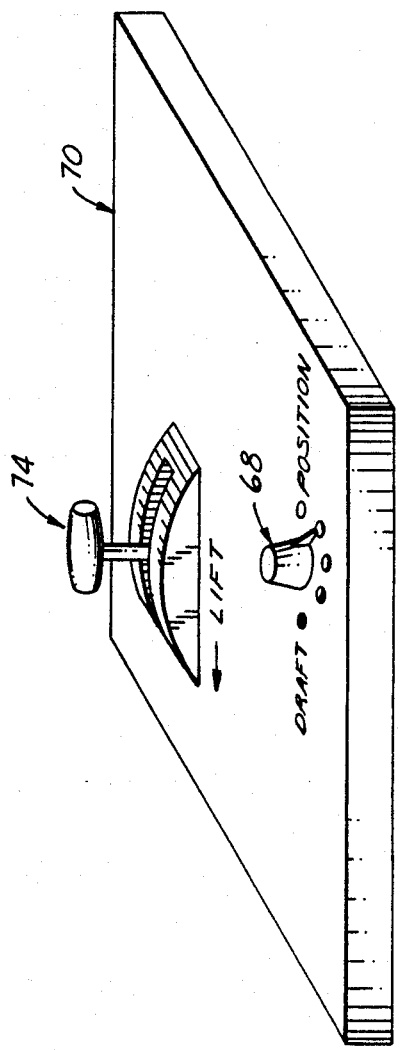

4,796,712

DRAFT LOAD CONTROL SYSTEMS

BACKGROUND OF THE INVENTION

The present invention relates to both a method and a control system for adjusting the load exerted by a draft implement such as a plow or a cultivator.

It is known to adjust the depth of a draft implement in inverse relation to a measurement of draft load. One of two reasons are typically given for this adjustment. One reason is that without depth adjustment the vehicle engine may stall or incur damage when an excess draft load is encountered such as when encountering heavy soil conditions during field plowing. Another reason is that without depth adjustment, the depth of the draft implement increases when the towing vehicle encounters an incline and, conversely, decreases when the towing vehicle encounters a decline. By adjusting the depth of the draft implement in inverse relation to an indication of draft load, a more uniform plowed field is obtained when a field grade is encountered.

The measurement of draft load has commonly been provided by coupling a force transducer to one of the linking arms attached to the draft implement. However, force transducers must operate in an exposed, hostile environment. Further, since the actual draft force is distributed over several linking arms, an accurate measurement of draft force is not obtained from a single link arm.

Various approaches have therefore evolved wherein the measurement or indication of draft load is inferred from a measurement of engine parameters. In one approach, draft load is inferred from a deviation in measured engine rpm from a single set value of engine rpm associated with maximum horsepower output. A problem with this approach is that the system is prone to fluctuate or search around a desired depth associated with the set value of engine rpm. Thus, even without variations in soil density, or variations in grade, the plowed field depth will fluctuate.

In another approach, as disclosed in U.S. Pat. No. 4,077,475, draft depth is varied in inverse relation to a combination of rpm deviation and actual implement depth. By adding feedback for actual implement depth, the effect of depth variation with variations in engine rpm is allegedly dampened. The inventors herein have recognized, however, that the degree of dampening is not adjustable to compensate for a change in the draft implement used or for changes in field soil conditions.

A disadvantage with the above approaches is that draft vehicles are usually operated near the peak horsepower of the engine wherein the torque versus rpm curve is relatively flat. Substantially large variations in engine rpm are therefore associated with relatively small variations in draft load. Accordingly, inferring load by an rpm deviation from a desired rpm value is not satisfactory.

SUMMARY OF THE INVENTION

It is an object of the present invention to provide both an apparatus and a method responsive to an accurate indication of draft load for adjusting the depth of a draft implement without incurring unwanted fluctuations in draft depth.

In one aspect of the invention, the problems and disadvantages described hereinabove are solved, and object achieved, by an apparatus for adjusting the depth of a draft implement propelled by a vehicle having an internal combustion engine. In a particular embodiment of the invention, the apparatus comprises: a throttle position sensor for sensing the throttle position of the engine; first memory means coupled to the throttle position sensor for providing a zero engine load rpm value for the sensed throttle position; rpm sensing means for providing an indication of actual engine rpm; an rpm comparator coupled to both the first memory means and the rpm sensing means for providing an indication of engine lug down; second memory means responsive to the indication of the engine lug down for providing a draft load signal representative of the draft load exerted by the implement; an implement position sensor for providing an actual position signal related to the actual depth of the implement; combining means for combining a preselected portion of the draft load signal with a preselected portion of the actual position signal to form a feedback signal; position means for providing a desired position signal representative of the desired position of the implement; and error signal generating means for generating an error signal by comparing the desired position signal to the feedback signal, the error signal providing a command for adjusting the depth of the implement. Preferably, the preselected portions of both the draft load signal and the actual position signal are operator selectable.

By using the measurement of engine lug down an advantage is obtained of providing a more accurate indication of draft load than heretofore possible. Further, by combining preselected portions of both draft load feedback and position feedback, the feedback sensitivity may be adjusted. Another advantage is thereby obtained of enabling the operator to adjust for sensitivity when the draft implement is changed or the soil conditions vary.

DESCRIPTION OF THE DRAWINGS

FIG. 1 shows a draft implement coupled to a tractor via a conventional hydraulic power lift system.

FIG. 3 illustrates various operator controls which interact with portions of the components shown in FIG. 2.

DESCRIPTION OF THE PREFERRED EMBODIMENT

Figure 2:
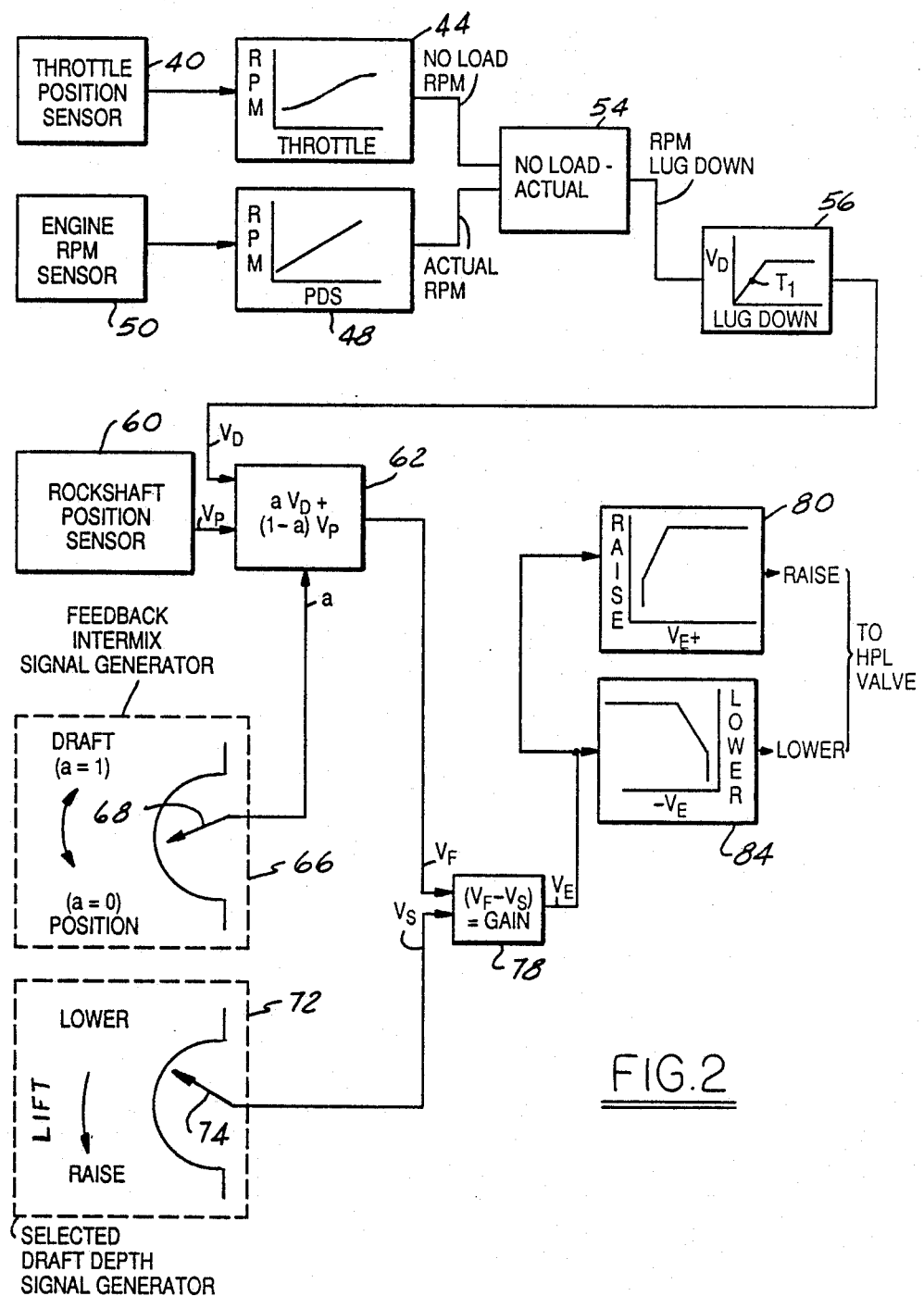
FIG. 2 shows a block diagram of the draft load control system.

Referring to FIG. 1, hydraulic power lift system 10 of tractor 12 is shown coupled to draft implement 14 herein illustrated as a plow. Lift system 10, which is only one embodiment of a large family of lift systems, is herein shown including rocker shaft 18 coupled to lower link 26 by lift arm 22. Lower link 26 and upper link 28 are shown coupled to draft implement 14 and pivotably attached to tractor 12 at respective pivot points 32 and 34. Hydraulic cylinder 30 is shown coupled to rocker shaft 18 for raising and lowering lower link 26 via lift arm 22. Accordingly, draft implement 14 is also raised and lowered in response to movement of rocker shaft 18.

Referring now to FIG. 2, a block diagram of the draft load control system is shown. More specifically, throttle position sensor 40 is coupled to the tractor throttle (not shown) for providing an electrical signal (throttle) proportional to the throttle position or throttle angle. Throttle mapping or memory 44, shown coupled to throttle position sensor 40, contains values of engine rpm at zero engine load for different throttle positions. As described in more detail hereinafter, with particular reference to FIG. 4, throttle memory 44 provides an electrical signal (no load rpm) representative of engine rpm at the sensed throttle position under zero engine load conditions.

Actual rpm signal generator 48 provides an electrical signal (actual rpm) representative of actual engine rpm in response to tachometer or engine rpm sensor 50. The actual rpm signal is subtracted from the zero load rpm signal in subtractor 54 to provide an electrical signal (rpm lug down) representative of engine lug down at the sensed throttle position Draft load memory 56 contains a memory of the draft load for different lug down values characteristic of the internal combustion engine used in tractor 12. As described in greater detail hereinafter, draft load memory 56 is related to the torque versus rpm curve for the particular engine used. Accordingly, draft load memory 56 provides an electrical signal $V_D$ proportional to the draft load exerted upon tractor 12.

Rocker shaft position sensor 60 is shown coupled to rocker shaft 18 for providing a position signal $V_P$ proportional to the position of rocker shaft 18 and, accordingly, the actual depth of draft implement 14. A preselected portion (a) of signal $V_D$ and a complementary preselected portion (1−a) of signal $V_P$ are combined in feedback signal combiner 62 to form a feedback signal $V_F$. The preselected portion (a) is determined by feedback intermix signal generator 66 which is responsive to operator selectable draft/position control 68 located on control panel 70 (FIG. 3). More specifically, feedback signal combiner 62 generates $V_F$ in accordance with the following equation:

$$V_F=(a)\ V_D+(1-a)\ V_P.$$

When draft/position control 68 is positioned to draft only, preselected portion (a) is equal to 1. Feedback signal $V_F$ is then equivalent to draft load signal $V_D$ whereby the draft load control system is responsive only to draft load signal $V_D$. Conversely, when draft/position control 68 is placed fully at the "position" setting, preselected portion (a) is equal to zero. Feedback signal $V_F$ is then equivalent to draft position signal $V_P$ wherein the draft load control system is responsive only to draft position signal $V_P$. As described in greater detail hereinafter, the operator selection of draft/position selector 68 determines the sensitivity or dampening of the draft load control system.

Continuing with FIG. 2, selected draft depth signal generator 72 is coupled to draft depth selector 74 located on control panel 70 (FIG. 4) for providing a signal $V_s$ representative of the desired draft depth selected by the operator. Signal $V_s$ is subtracted from signal $V_F$ to generate an error signal $V_E$ in error signal generator 78. Raise command signal generator 80 and lower command signal generator 84 are each coupled to error signal $V_E$ for providing the appropriate raise and lower signals to the hydraulic power lift valve (not shown) for operating hydraulic cylinder 30. The raise and lower signals are graphically illustrated as being linearly proportional to $V_E$ until a maximum (100%) signal strength is achieved. By varying this proportionality, additional dampening is introduced into the draft load control system.

Figure 4:
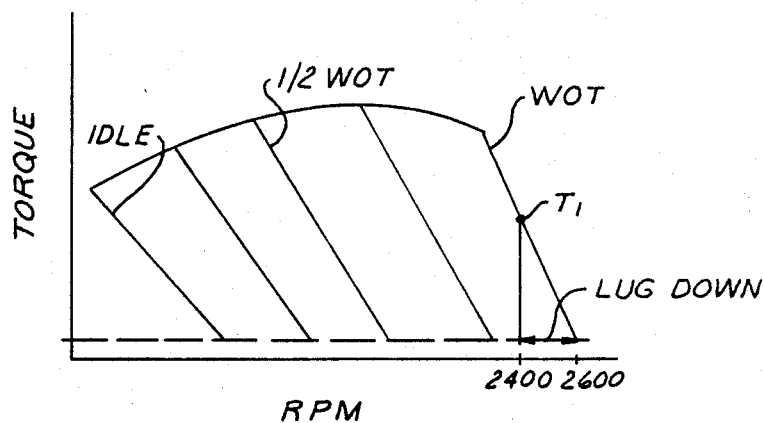
FIG. 4 is a graphical representation of the torque versus rpm curve for a particular internal combustion engine operated under control of a governor.

Referring now to FIG. 4, an example is presented of how memory values are obtained for throttle memory 44 and draft load memory 56 FIG. 4 is a graphical representation of measured torque versus rpm at various throttle positions for a particular engine operating under governor control. The graph illustrated in FIG. 4 is generated by well known engine mapping techniques wherein the engine is subjected to various operating conditions so as to determine the relationships between the illustrated parameters. More specifically, at a wide-open throttle position (WOT), the linear downward portion of the curve represents engine operation under the control of a governor. Similarly, the other downward sloping portions illustrate operation under governor control at different throttle settings, herein shown as fractions of WOT. The linear portions representative of governor control are where the tractor engine typically operates. That is, the governor supplies more fuel to the engine at increasing loads to prevent a fall in engine rpm.

The horizontal dash line in FIG. 4 illustrates a zero load condition. Accordingly, the memory programmed into throttle memory 44 constitutes the set of rpm values associated with the intersection of the horizontal dash line and torque curve. Stated another way, the memory values stored in throttle memory 44 are engine rpm values at associated throttle positions under zero load conditions.

Memory values for draft load memory 56 are also obtained from the mapping values illustrated in FIG. 4. For example, in a case where the engine is operated at WOT and the engine has been slowed in rpm or lugged down from a zero load rpm of 2600 to 240 rpm, the engine lug down in response to a draft load is 200 rpm. An indication of the draft load is then obtained by scaling the shift in torque along the torque curve associated with the measured lug down herein represented as $T_1$. The scaling is achieved by multiplying the torque value $T_1$ by a proportionality factor which is a scaling constant between reflected draft load to the engine and engine torque. By similar mapping, the entire memory of draft load memory 56 is programmed for a particular tractor engine. Accordingly, draft load memory 56 provides a draft load signal $V_D$ proportional to the draft load of tractor 12.

Those skilled in the art will recognize that the reflected draft load to the engine will vary as a function of the transmission gear in use. The scaling factor between engine torque and draft load is, therefore, changed with changes in transmission gear.

Figure 5:
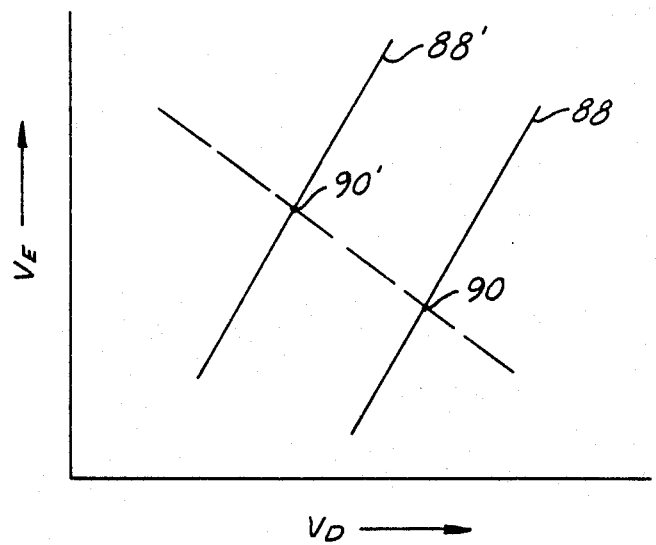
FIG. 5 is a graphical representation of various signals associated with the block diagram of FIG. 2.

Now referring to FIG. 5, and continuing with FIG. 2, the operation of the draft load system is further described. Graph line 88 of FIG. 5 is a graphical representation of draft load error signal $V_E$ as a function of draft signal $V_D$ at a particular setting of draft depth selector 74. It is seen that as draft load signal $V_D$ increases, with an increase in draft load, error signal $V_E$ increases by an amount determined by the slope of line 88. Draft/position selector 68, via feedback intermix signal generator 66 and feedback signal combiner 62, determines the slope of line 88. As draft/position selector 68 is turned towards the "draft" setting, intermix value (a) increases thereby increasing the slope of line 88. That is, the draft load control system, and error signal $V_E$ in particular, becomes more responsive to changes in draft load. Conversely, as the draft/position selector 68 is turned towards the "position" setting, the slope of line 88 becomes flatter and, accordingly, the draft load control system, and error signal $V_E$ in particular, becomes less responsive to changes in draft load.

Graph line 88' shows an illustrated example of a shift in graph line 88 caused by an operator selected offset of draft depth selector 74 (FIG. 3) in the "lift direction". Assuming no changes in soil density or grade, the equilibrium point between signal $V_D$ and signal $V_E$ is shown as shifting from point 90 to point 90'. More specifically, in response to the raised offset of draft depth selector 74, signal $V_E$ is proportionally increased. Draft implement 14 is then raised by action of raise command signal generator 80 and the hydraulic power lift valve. In response to a raising of draft implement 14, the draft load is correspondingly decreased. Accordingly, for this particular example, the equilibrium point between draft load signal $V_D$ and error signal $V_E$ is now at point 90'.

In a typical operation, the operator will first turn draft/position selector 68 (FIG. 3) fully to the "position" setting and also move draft depth selector 74 (FIG. 3) to the desired draft depth before beginning a row. In response, preselected portion (a) is set at a zero level wherein feedback signal $V_F$ is equal to draft position signal $V_P$. Error signal $V_E$ is then only equal to the difference between draft position signal $V_P$ and selector position signal $V_s$. Accordingly, the depth of draft implement 14 is adjusted by appropriate action of raise command signal generator 80 and lower command signal generator 84 until selected position signal $V_s$ and draft position signal $V_P$ are equal. That is, the depth of draft implement 14 will adjust by action of the draft control system and the hydraulic power lift valve to the depth selected by draft depth selector 74.

After the desired depth of draft implement 14 is electronically set, the operator then moves draft position selector 68 (FIG. 3) toward the "draft" setting so that adjustments to the depth of draft implement by the draft load control system is responsive to variations in draft load. During field plowing, the operator adjusts the sensitivity of the draft load control system, as desired, by changing the setting of draft position selector 68.

Various modifications and variations will no doubt occur to those skilled in the various arts to which this invention pertains. For example, the draft load control system may be designed, by those having appropriate skills in the art, with either analog devices or digital devices. These and all other variations which basically rely on the teachings to which this disclosure has advanced the art are properly considered within the scope of this invention

We claim:

1. A method for adjusting the depth of a draft implement propelled by a vehicle having an internal combustion engine, comprising the steps of:
    sensing the throttle position of said engine;
    comparing a stored rpm value representative of a zero engine load condition at said sensed throttle position to an actual rpm measurement of said engine;
    generating a draft load signal representative of the draft load exerted by said implement said draft load signal being determined by said step of comparing rpm values; and
    generating an error signal by comparing a reference value representative of a desired implement depth to said draft load signal, said error signal providing a command for adjusting the depth of said implement.

2. A method for adjusting the depth of a draft implement propelled by a vehicle having an internal combustion engine, comprising the steps of:
    sensing the throttle position of said engine;
    comparing a stored rpm value representative of a zero engine load condition at said sensed throttle position to an actual rpm measurement of said engine;
    generating a draft load signal representative of the draft load exerted by said implement said draft load signal being determined by said step of comparing rpm values;
    sensing the actual depth of said implement to form a position signal related to the depth of said implement;
    combining a portion of said draft load signal with another portion of said position signal to form a feedback signal; and
    generating an error signal by comparing a reference value representative of a desired implement depth to said feedback signal, said error signal providing a command for adjusting the depth of said implement.

3. An apparatus for adjusting the depth of a draft implement propelled by a vehicle having an internal combustion engine, comprising:
    a throttle position sensor for sensing the throttle position of said engine;
    first memory means coupled to said throttle position sensor for providing a zero engine load rpm value for said throttle position;
    rpm sensing means for providing an actual engine rpm indication;
    an rpm comparator coupled to both said first memory means and said rpm sensing means for providing an indication of engine lug down;
    second memory means responsive to said indication of said engine lug down for providing a draft load signal representative of the draft load exerted by said implement;
    an implement position sensor for providing an actual position signal related to the actual depth of said implement;
    selecting means for selecting a portion of said draft load signal and another portion of said actual position signal;
    combining means responsive to said selecting means for combining said portion of said draft load signal with said another portion of said actual position signal to form a feedback signal;
    position means for providing a desired position signal representative of the desired position of said implement; and
    error signal generating means for generating an error signal by comparing said desired position signal to said feedback signal, said error signal providing a command for adjusting the depth of said implement.

4. The apparatus recited in claim 3 wherein said first memory means comprises a mapping of zero load rpm versus throttle position of said engine.

5. The apparatus recited in claim 4 wherein said second memory means corresponds to a torque versus rpm curve of said engine.

6. The apparatus recited in claim 5 wherein said portion of said draft load signal is complementary to said another portion of said actual position signal.

7. The apparatus recited in claim 6 further comprising operator actuable means coupled to said selection means for selecting said portion of said draft load signal and said another portion of said actual position signal.

8. The apparatus recited in claim 7 wherein said position means is operator selectable.

9. The apparatus recited in claim 8 further comprising a hydraulic cylinder coupled to said draft implement and a hydraulic power lift valve coupled to said hydraulic cylinder, said hydraulic power lift valve being responsive to said error signal.

* * * * *

UNITED STATES PATENT AND TRADEMARK OFFICE
CERTIFICATE OF CORRECTION

PATENT NO. : 4,796,712
DATED : January 10, 1989
INVENTOR(S) : Rutkowski et al.

It is certified that error appears in the above-identified patent and that said Letters Patent is hereby corrected as shown below:

On the cover page change the Assignee from "Ford Motor Company, Dearborn, Michigan" to --Ford New Holland, Inc., Troy, Mich. --.

Signed and Sealed this

Twentieth Day of June, 1989

Attest:

DONALD J. QUIGG

*Attesting Officer*  *Commissioner of Patents and Trademarks*